W. J. FRYER, Jr.
Joint for Cement Illuminating Tiles for Roofs and Pavements.
No. 230,931. Patented Aug. 10, 1880.
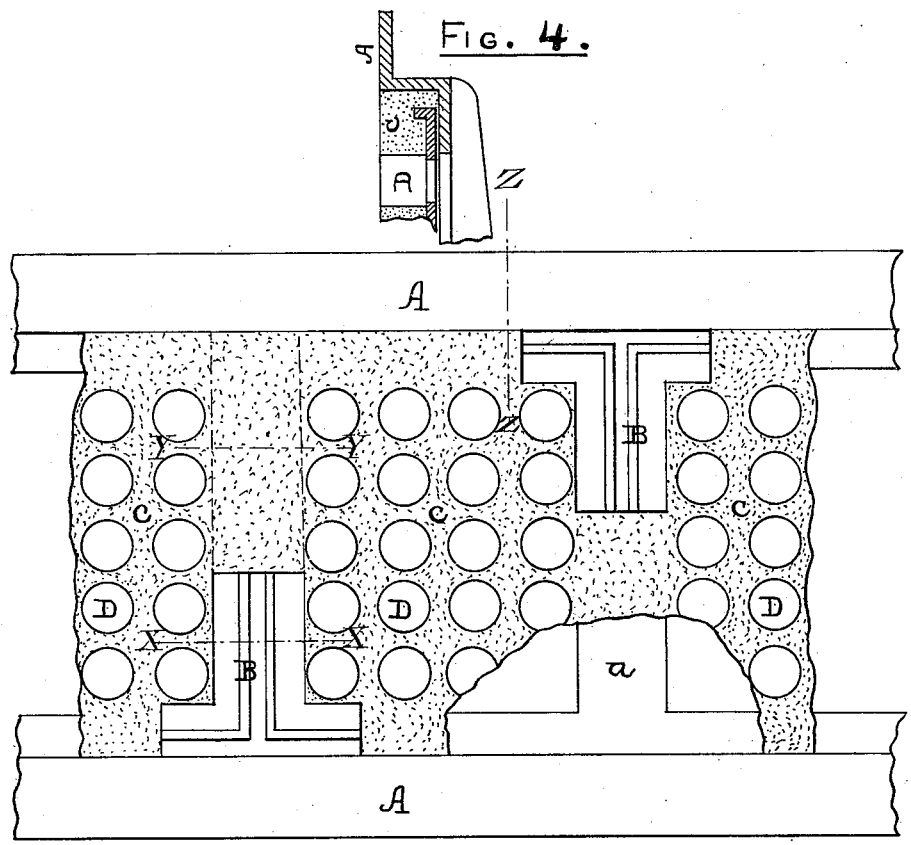
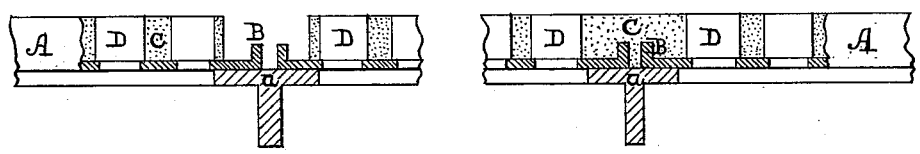
WITNESSES:
John Adams
Arthur Lawrence
INVENTOR:
Wm. J. Fryer, Jr.

UNITED STATES PATENT OFFICE.

WILLIAM J. FRYER, JR., OF NEW YORK, N. Y.

JOINT FOR CEMENT ILLUMINATING-TILES FOR ROOFS AND PAVEMENTS.

SPECIFICATION forming part of Letters Patent No. 230,931, dated August 10, 1880.

Application filed January 31, 1880.

*To all whom it may concern:*

Be it known that I, WILLIAM J. FRYER, Jr., iron-founder, of No. 104 Goerck street, in the city of New York, county and State of New York, have invented a new and useful Improvement in Joints for Cement Illuminating-Tiles for Roofs and Pavements, of which the following is a specification, reference being had to the accompanying drawings, in which—

Figure 1 is a plan of a platform of cement illuminating-tiles. Fig. 2 is a section at X X. Fig. 3 is a section at Y Y, and Fig. 4 is a section at Z Z.

A is the usual cast-iron frame with cross-bearers $a$. B is the iron dish or grating of the tile. C is the cement. D D are the glass lenses.

Similar letters of reference indicate corresponding parts.

The object of my invention is to make a joint for cement illuminating-tiles that will be undiscernible from above and be perfectly water-tight, thus at once improving the appearance and the quality of the work.

Cement illuminating-tiles are put down over an area-opening in the following manner: A cast-iron frame is made to bridge the opening, which frame has numerous cross-bearers spaced in accordance with the width of pattern of the tile, and around the back, front, and sides of the frame runs a rabbet or flange, so that when the tiles are laid in the frame they rest on the cross-bearers and flanges, the top of the tiles being on the same plane with the top of the frame. On the cross-bearers two tiles meet, the cross-bearers being wide enough to give each tile its proper bearing. After the tiles are bolted down to the cross-bearers and flanges the joints between the tiles, where they meet together, as well as at the back and front, where they lie on the flanges, are puttied or cemented up, and these joints are usually painted black with asphalt varnish. At the meeting-points of the tiles the joints are so small as to be difficult to make water-tight. Entirely around each and every tile is an uneven and unsightly line of joint, which detracts from the otherwise pleasing appearance of the platform.

By reference to my drawings it will be seen that I employ the usual cast-iron frame A, with cross-bearers $a$ and flanges. The border B of my dish or grating I keep considerably lower than the upper surface of the glass and cement filling.

Before I fill the dish with the Portland cement, (which is applied in a plastic state,) I lay a strip of wood around the border within the dish, and afterward remove this strip when the cement has become set. By means of this wooden strip so laid in the dish the cement is kept back from the border any desirable distance—say one-half or three-quarters of an inch. The manufactured tiles are now brought to the building where they are to be used and bolted down in the frames. Where the tiles meet on the cross-bearers it will be readily understood that there is the usual small space between the iron-work of the tiles, and also a greater space between the cement-filling of the respective tiles. As the last act in laying the work, I pour in plastic cement, thus filling the space between the iron-work of the tiles, and into the dish to connect the cement of one tile with the cement of the other tile, and the result is a perfectly water-tight joint and a blind one. No joint is afterward perceptible anywhere around the tiles, and the upper surfaces of the bolt-heads, which hold the tiles down to the frames, are, of course, not to be seen, as they are covered as well. To the eye one large tile completely fills the frame, and the platform is therefore a far handsomer one and is thoroughly water-tight.

It will be observed that my invention relates solely to the meeting-joints of the tiles when resting on the cross-bearers and flanges of the cast-iron frame, and does not relate to the connections of a wrought-iron spider-web grating, which is put together by means of interlocking heads and grouting, or to cement tiles having channels in the body of the same to receive cement or inlays, as these latter features are described in the specification of Thaddeus Hyatt in patent dated July 23, 1878, and numbered 206,332, and duly claimed in Nos. 11, 18, and 22 of the claims of said United States Patent.

What I claim as my invention is—

The means, substantially as herein described, of making a blind and water-tight joint for Portland-cement tiles, which consists in leaving a space within and around the periphery or border of the tiles unfilled, and, after the said tiles are fastened to the frames, filling in said spaces with cement corresponding in kind and in depth to the filling of the tiles, as set forth.

In testimony whereof I have hereunto set my hand in the presence of two subscribing witnesses.

WM. J. FRYER, JR.

Witnesses:
  JOHN ADAMS,
  ARTHUR LAWRENCE.